BEST AVAILABLE COPY
E. Finney,
Permutation Lock.
No. 29. A.I. Patented Jan. 14, 1840.
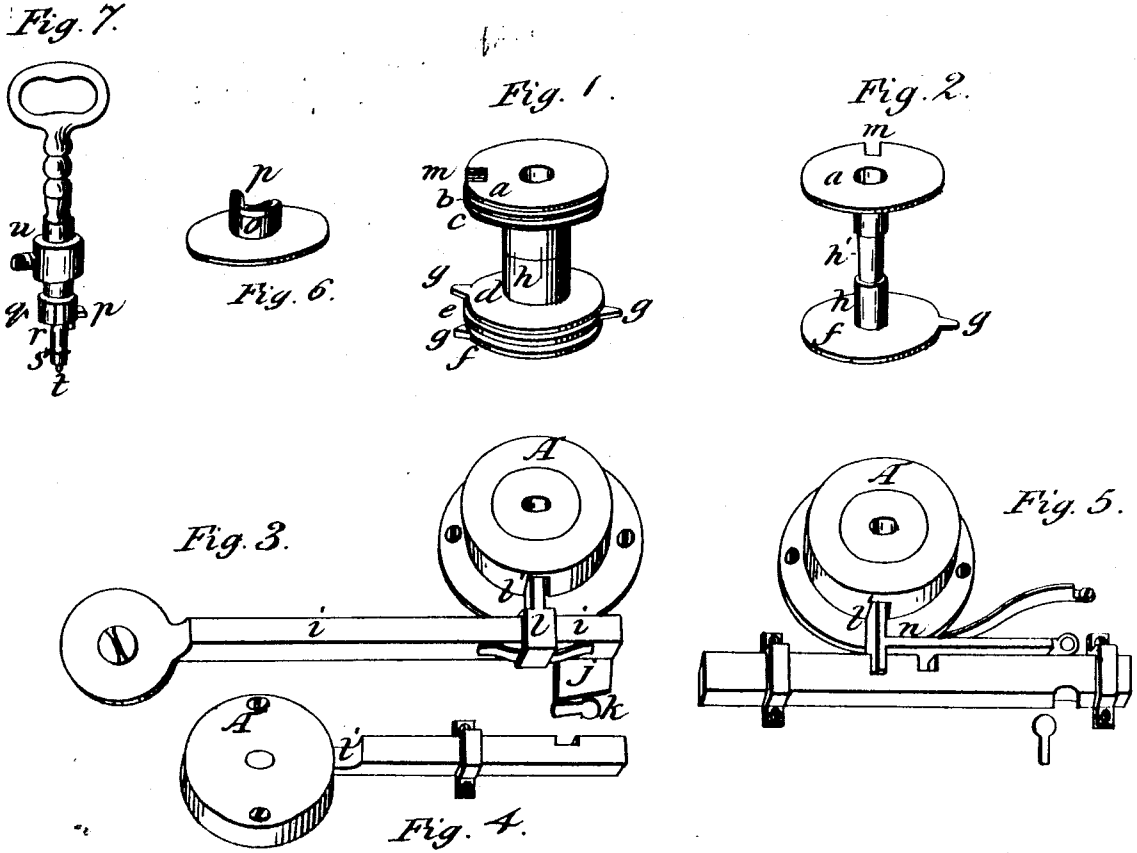
AM. PHOTO-LITHO. CO. N.Y. (OSBORNE'S PROCESS)